United States Patent [19]

Nishimura

[11] Patent Number: 4,536,061
[45] Date of Patent: Aug. 20, 1985

[54] DISPLAY ELEMENT
[75] Inventor: Yukuo Nishimura, Sagamihara, Japan
[73] Assignee: Canon Kabushiki Kaisha, Tokyo, Japan
[21] Appl. No.: 445,069
[22] Filed: Nov. 29, 1982

[30] Foreign Application Priority Data

| Dec. 11, 1981 | [JP] | Japan | 56-200766 |
| Dec. 11, 1981 | [JP] | Japan | 56-200767 |
| Dec. 11, 1981 | [JP] | Japan | 56-200768 |
| Dec. 11, 1981 | [JP] | Japan | 56-200769 |
| Dec. 11, 1981 | [JP] | Japan | 56-200770 |
| Dec. 11, 1981 | [JP] | Japan | 56-200771 |
| Dec. 11, 1981 | [JP] | Japan | 56-200772 |
| Dec. 11, 1981 | [JP] | Japan | 56-200773 |
| Dec. 11, 1981 | [JP] | Japan | 56-200774 |
| Dec. 11, 1981 | [JP] | Japan | 56-200775 |
| Dec. 11, 1981 | [JP] | Japan | 56-200776 |
| Dec. 11, 1981 | [JP] | Japan | 56-200777 |
| Dec. 11, 1981 | [JP] | Japan | 56-200778 |
| Dec. 11, 1981 | [JP] | Japan | 56-200779 |
| Dec. 11, 1981 | [JP] | Japan | 56-200780 |
| Dec. 11, 1981 | [JP] | Japan | 56-200781 |
| Dec. 11, 1981 | [JP] | Japan | 56-200782 |
| Dec. 11, 1981 | [JP] | Japan | 56-200783 |
| Dec. 11, 1981 | [JP] | Japan | 56-200784 |

[51] Int. Cl.³ .................................. G02F 1/01
[52] U.S. Cl. ................ 350/354; 350/267; 350/353
[58] Field of Search ............... 350/353–355, 350/267, 362–363, 359; 40/406–407, 447; 340/758–759, 788

[56] References Cited

U.S. PATENT DOCUMENTS

| 2,185,733 | 1/1940 | Kaufman | 40/406 |
| 3,158,678 | 11/1964 | Anderson | 350/353 |
| 3,219,993 | 11/1965 | Schwertz | 350/353 |
| 3,612,653 | 10/1971 | Rauchman | 350/363 |
| 3,703,332 | 11/1972 | Taylor | 350/363 |
| 3,706,149 | 12/1972 | Olivieri | 40/407 |
| 3,840,695 | 10/1974 | Fischer | 350/408 |
| 4,169,661 | 10/1979 | Yamada et al. | 350/353 |

FOREIGN PATENT DOCUMENTS

| 52-13094 | 4/1977 | Japan |  |
| 52-36019 | 9/1977 | Japan |  |
| 0007360 | 1/1979 | Japan | 350/353 |

OTHER PUBLICATIONS

Taylor, G. W., "Electrical Control of Light by Fluid Logic Devices", App. Optics, 6-1973, pp. 1227–1238.

Primary Examiner—William H. Punter
Attorney, Agent, or Firm—Fitzpatrick, Cella, Harper & Scinto

[57] ABSTRACT

Display is effected by utilizing bubbles formed in a liquid layer by heat.

29 Claims, 14 Drawing Figures

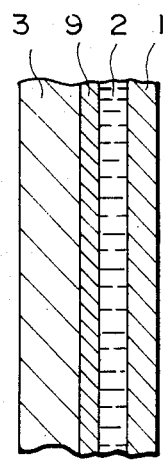
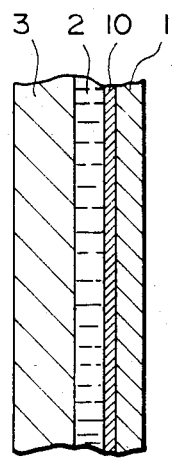
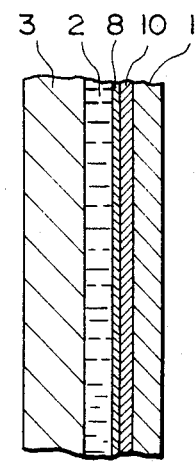
FIG. 4  FIG. 5  FIG. 6
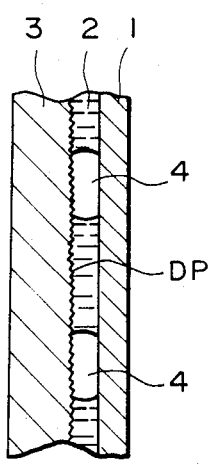
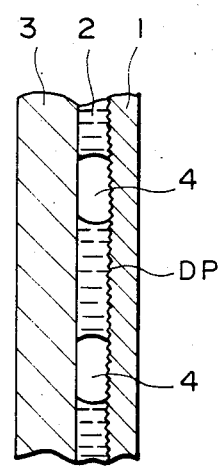
FIG. 7  FIG. 8

DISPLAY ELEMENT

BACKGROUND OF THE INVENTION

1. Field of the Invention

This invention relates to an improved display device and an image display method.

2. Description of the Prior Art

At present, there is widely used the so-called "CRT" (cathod ray tube) as a display device for various kinds of terminal office appliances and measuring instruments, or a display device for monitoring television broadcasting and video-camera taking. With this CRT, however, there still remains dissatisfaction such that the image quality on this display device has not attained a level of the image quality comparable to that on a hard copy obtained by the silver salt method or the electrophotographic method in respect of the image quality, image resolution, and display capacity.

As a substitution for this CRT, there has been made an attempt to put the so-called liquid crystal panel which gives dot-matrix display with liquid crystal into practical use, although no satisfactory result has yet been obtained in respect of its driving performance, operational reliability, and productivity.

SUMMARY OF THE INVENTION

The present invention aims at solving various problems which the conventional techniques in this field of art could not solve.

In other words, the object of the present invention is to provide a method for displaying an image of good quality and high resolution as well as an improved display device excellent in its driving performance, productivity, and operational reliability, and having high density image elements.

According to the present invention, there is provided a display element comprising a liquid layer and a heat generating element to produce bubbles in said liquid layer. Thus, in one aspect of the invention there is provided a display element for display of a visible image by providing contrast between image and non-image sections, based on the difference between the light reflected from behind the liquid layer and the light reflected from the liquid layer.

According to another aspect of the present invention, there is provided a display device comprising a display element consisting essentially of a liquid layer and a heat generating element to produce bubbles in said liquid layer and a liquid circulation conduit communicatively connected with said liquid layer.

According to a further aspect of the present invention, there is provided an image display method comprising producing bubbles in a liquid layer and forming images utilizing said bubbles as picture elements.

BRIEF DESCRIPTION OF THE DRAWINGS

FIG. 1 to FIG. 10 are respectively schematic cross-sectional views for explaining various embodimental constructions of the display element for use in the present invention;

DETAILED DESCRIPTION OF THE PREFERRED EMBODIMENTS

Figure 1:
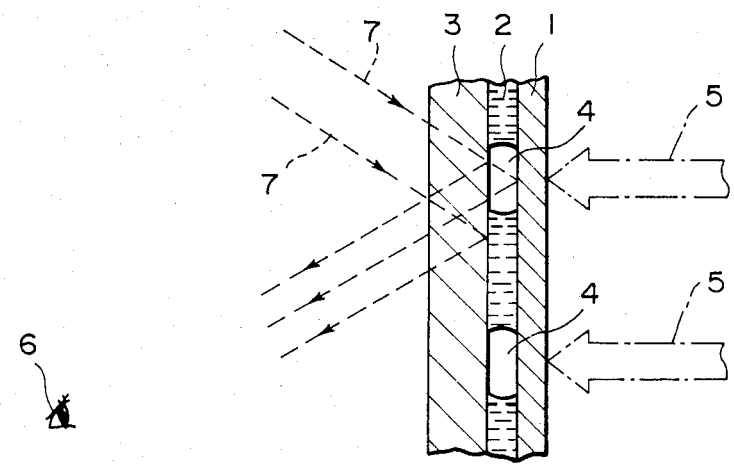

In the followings, the present invention will be described in detail with reference to several preferred embodiments thereof as illustrated in the accompanying drawing.

First of all, one of the image forming principles according to the present invention will be outlined in reference to FIGS. 1 through 8.

In the drawing, a reference numeral 1 designates a radiation ray absorbing layer, a numeral 2 refers to a thin liquid layer, and 3 denotes a transparent protective plate. These three layers are laminated to construct the display element of FIG. 1 (in a schematic cross-sectional view). The radiation ray absorbing layer 1 is colored (preferably in black) to efficiently absorb the radiation ray, inter alia, infra-red ray, and is obtained by film-forming technique of various inorganic or organic materials which are difficult to melt. In case absorbing layer 1 is deficient in the self-supporting function, it is desirable that the layer be lined with an additional supporting plate of glass, plastic or the like having the radiation ray transmitting property (not shown).

As a liquid to construct thin liquid layer 2, there are three types of liquids when classified optically: (1) a liquid transmitting liquid; (2) a colored liquid; and (3) a white turbid liquid. As the basic component for this liquid, there may be used water or various organic solvents, or their mixture.

Examples of the organic solvents are: alkyl alcohols having 1 to 4 carbon atoms such as, for example, methyl alcohol, ethyl alcohol, n-propyl alcohol, isopropyl alcohol, n-butyl alcohol, sec-butyl alcohol, tert-butyl alcohol, isobutyl alcohol, and the like; amides such as dimethyl formamide, dimethyl acetamide, and the like; amines such as triethanol amine, diethanol amine, and the like; ketones or keto-alcohols such as acetone, diacetone alcohol, and the like; ethers such as tetrahydrofuran, dioxane, and the like; polyalkylene glycols such as polyethylene glycol, polypropylene glycol, and the like; alkylene glycols, in which the alkylene group contains 2 to 6 carbon atoms, such as ethylene glycol, propylene glycol, butylene glycol, hexylene glycol, diethylene glycol, and the like; glycerine; and lower alkyl ethers of polyhydric alcohol such as ethylene glycol methyl ether, diethylene glycol methyl (or ethyl) ether, triethylene glycol monomethyl (or ethyl) ether, and the like.

The colored liquid in the above item (2) refers to any colored (including black) liquid obtained by dissolving or dispersing various sorts of dyes and pigments in the above-enumerated liquids. The white turbid liquid in the above item (3) refers to white or light colored liquid obtained by dispersing very fine light-dispersing particles (irrespective of whether they are solid component, or not) in the above-enumerated liquids.

Thickness of the thin liquid layer 2 should desirably be such that the quantity of the transmitted light becomes substantially less than half the quantity of the incident light (in general, from 1 $\mu$m to 100 $\mu$m). In this case, the decrease in the transmitted light quantity is not required to span over the entire wavelengths in the visible range of light. That is, the decrease may be that
} in a light of a part of the visible light region. Further, this decrease in the transmitted light quantity may be derived from either the light absorption or light scattering.

The color of the liquid should avoid being the same as that of the above mentioned radiation ray absorbing layer 1 because of probable impossibility in forming contrast between an image section and a non-image section in the display. This will be more apparent from the image forming principle explained later.

For the transparent protective plate 3, there may be used glass and plastic materials having pressure-resistant property and light tranmitting property (colorless or light-colored transparency). This protective plate may be omitted, in some case, when the display element is disposed or arranged in the horizontal position.

When the radiation ray (particularly, infra-red ray) 5 is projected onto the thus constructed display element from the right side thereof, as shown in FIG. 1, the layer generates heat at positions which are irradiated. As soon as a part of the absorbing layer 1 generates heat in this manner, the liquid in this thin liquid layer 2 which is in contact with said portion of the absorbing layer 1 is heated by the heat conduction, and the liquid temperature is raised, and finally the liquid becomes boiled to form bubbles 4 in the thin liquid layer 2. Incidentally, when the radiation ray 5 is projected onto the display element, it can be irradiated in a pattern form corresponding to a predetermined image, or the radiation ray 5 may be formed into a beam in utilization of a laser beam source and a multitude of such beams are projected in bulk in a dot-form, or a single beam or one-line beam is caused to scan on the radiation ray absorbing layer 1. Since it is extremely difficult in practice to form bubbles 4 having uniform optical characteristics in a wide area, the latter method, i.e., the one wherein the bubbles 4 are formed in the dot-form, is considered to be advantageous from the practical standpoint.

The irradiating direction of the radiation ray 5 is not limited to the illustrated embodiment alone. That is, when the transparent protective plate 3 and the thin liquid layer 2 transmit the radiation ray, the irradiation may be made from the left side of the drawing.

As the shape of the bubble 4 formed in the thin liquid layer 2 by applying heat pulses, a flat shape bubble is effective which generates at the surface of the absorbing layer 1, grows larger without leaving the layer surface, and forms the void in the thin liquid layer 2 reaching the protective plate 3.

According to the present invention, when bubbles 4 are created in the thin liquid layer 2, distinction of the displayed picture elements, in the first mode (where a light transmitting liquid is used), can be done on the basis of a difference in light quantity reaching an observer's eye 6. That is, although the light reflection on the surface of the bubbles in the light transmitting liquid is primarily very slight, when the bubbles are very small, the influences of the diffraction and the curvature of the bubbles result in increasing the light scattering effect by the bubbles. On the other hand, in the region where no bubbles exist, observation light 7 is mostly reflected by or absorbed in one part of the display element and then reaches the observer's eye 6, hence there occurs the above mentioned difference in the light quantity. In this case, the ideal shape of the bubble is semi-spherical (irrespective of whether it contacts the protective plate, or not), and its size should preferably be 40 μm or so in diameter.

According to the second mode (where a colored liquid is used), the distinction of the picture elements as displayed can be done on the basis of a difference in hue, lightness, or chroma of the picture element, which difference derives from such one that the portions where the bubbles are created form color by the absorbing layer 1, and that the remaining portions form color by the liquid in the thin liquid layer.

According to the third mode (where the white turbid liquid is used), distinction of the picture elements as displayed can be done by emergence of colored portions (the bubble formed portions) on the white or light-colored background.

In the above-described respective modes, time required for extinction of the bubbles 4 should preferably be 30 msec. in ordinary case, and this time should preferably be as long as possible from the standpoint of utilizing the afterimage effect.

In the foregoing, there is explained a method of forming the bubbles 4 to be the display picture elements by radiation heating. Alternatively, the present invention can be practised by replacing the radiation ray absorbing layer 1 shown in FIG. 1 by a heat transfer layer made of a metal material (not shown), and by contacting a heat generating element (not shown) with or bringing it closer to this heat transfer layer so as to transfer heat to the liquid for heating the same. In this case, however, there is such a disadvantage that the display picture elements do not become clear as the result of the heat diffusion unless concrete measures are taken for restricting the heat transfer direction.

For the display element in practicing the above mentioned first mode, it is preferable that the interface between the radiation ray absorbing layer 1 or the protective plate 3 and the thin liquid layer 2, be rendered a diffusion plane DP, as shown in FIG. 7 or 8 since the distinguishing effect of the picture elements as displayed can be increased. In this case, the distinctiveness of the display picture elements will be higher, as the refractive index of the raw material constituting the protective plate 3 and the refractive index of the liquid are closer.

Figure 2:
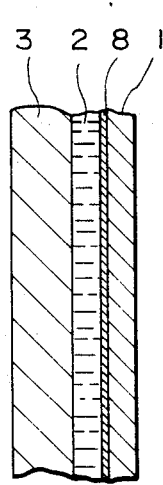

In order to further increase the distinguishing effect of the display picture elements, it is also possible to interpose a separate optical film 8 between the radiation ray absorbing layer 1 and the thin liquid layer 2, as shown in FIG. 2. This optical film may be either white or lightly colored, and have either a light reflecting property or a light diffusing property. Such optical film 8 should be formed of a metal material or a metal compound material having a high melting point so that the optical film per se may not melt at the time of heat transfer.

Figure 3:
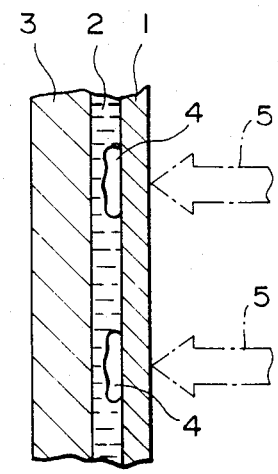

Further, in the present invention, even when the bubbles 4 generated in the thin liquid layer 2 as shown in FIG. 1 do not reach the protective plate 3 from the absorbing layer 1, as shown in FIG. 3, the required distinguishing effect of the displayed picture elements can be attained to some extent if, for example, the difference in lightness, chroma, or hue appears. Futhermore, when such difference is positively utilized, display of an intermediate tone can be effected.

In the present invention, when bubbles 4 are formed in a thin liquid layer 2, there accompanies an abrupt increase in the pressure so that there is much apprehension that the display element having a thin liquid layer 2 enveloped in a hermetic system is subject to damage. Accordingly, it is desirable that the pressure increase in the thin liquid layer 2 be relaxed by connecting the layer to an air chamber or a pressure accumulator (not shown). As another method of relaxing the pressure increase, a pressure absorbing film 9 may be disposed within the display element as shown in FIG. 4 to absorb the pressure generated in the thin liquid layer 2.

The combined use of the above mentioned two methods will, of course, bring out more effect. This pressure absorbing film 9 is made of a light-transmitting, elastic or highly visco-elastic material. It may also be made of the so-called sponge or spongy material having in its interior air bubbles or air vent holes or pores.

As a modification of the present invention, it is also feasible that the thin liquid layer 2 is communicatively connected with a heating chamber (not shown) to cause the liquid to circulate so as to pre-heat the same to a temperature in the vicinity of its boiling point. In this instance, since both heating quantity and heating time required for forming the bubbles 4 can be reduced, the forming speed of the bubbles 4, i.e., the display picture elements can be increased to a considerable degree.

For the same purpose as mentioned above, it may also be feasible that a heat generating layer 10 is interposed between the radiation ray absorbing layer 1 and the thin liquid layer 2 of the display element (vide FIG. 5), or between the radiation ray absorbing layer 1 and the optical film 8 (vide FIG. 6), to pre-heat the thin liquid layer 2 uniformly to a temperature in the vicinity of its boiling point.

In this case, when the radiation ray absorbing layer 1 or the optical film 8 is made of a conductive material, it is desirable to provide an insulating layer (not shown) between either of these layers and the heat generating layer 10.

The layer 10 of the heat generating body as used in the present invention is not necessarily limited to a planar heat generating body extending over the entire region of the display surface. In other words, it may be in a linear form or in a lattice form (either of them not being shown in the drawing) corresponding to the scanning line of the radiation beam.

In this instance, when the irradiation of the radiation ray and the heating by the heat generating body are synchronized, an energy-saving effect is further promoted.

For the raw material for such heat generating body, there may be used metal compounds such as hafnium boride, tantalum nitride, and the like, and alloy such as nickel-chromium alloy, and the like.

In the present invention, such construction of the display element that any of the structural elements susceptible to corrosion comes into direct contact with the thin liquid layer 2 would inevitably shorten the life of the display element, hence such construction should be avoided. More specifically, in the construction wherein the structural element susceptible to corrosion is in contact with the thin liquid layer 2, there take place chemical corrosion, electrochemical corrosion, mechanical corrosion due to cavitation, and others, whereby the display element is damaged in most case. It is therefore desirable that a corrosion-resistant protective film (not shown) is formed at the interface between the thin liquid layer 2 and the corrosive structural element. The material for such protective film may be selected from metal oxides such as $SiO_2$, $TiO_2$, and the like, heat-resistant plastics, and the like. It is, of course, possible to use the optical film 8 as the protective film.

Figure 9:
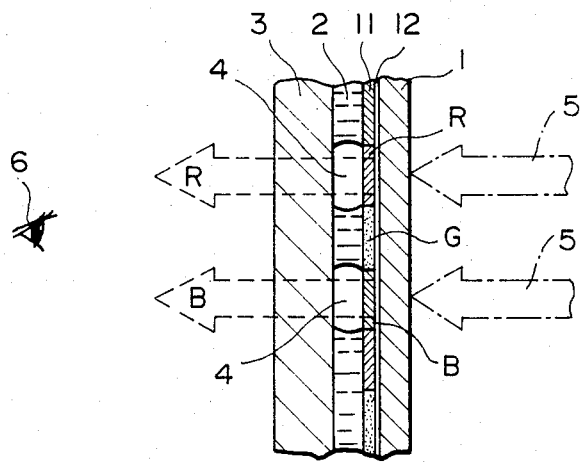

Referring to FIG. 9, the image forming principle of color images is as shown below.

FIG. 9 shows a schematic cross-sectional view of a color display element, in which the same structural elements as those explained in FIGS. 1 through 8 may be equally utilized except a color mosaic filter 11 and a reflecting layer 12. The concrete construction and the manufacturing technique of the color mosaic filter 11 are described in detail in Japanese Patent Publications No. Sho 52-13094 and No. Sho 52-36019, which are incorporated in this specification as a reference.

In the illustrated embodiment, when a bubble 4 is formed in the thin liquid layer 2 at a portion in contact with a red filter (R), red color is formed through this filter by the reflected light. Also, when a bubble (not shown) is formed in the thin liquid layer 2 at a portion in contact with a green filter (G), green color is formed through this filter by the reflected light. In the same manner, when a bubble 4 is formed in the thin liquid layer 2 at a portion in contact with a blue filter (B), blue color is seen through this filter due to the reflected light.

In this manner, the observer 6 sights a color formed by the additive color mixing. For example, when the bubbles are simultaneously formed in the mutually adjacent red, green and blue portions in the thin liquid layer, the observer 6 sights white.

It is also possible that, in place of the above mentioned filters (red, green and blue), a non-light-transmitting color forming layer (not shown) may be directly formed with colored organic or inorganic pigments. In either case, however, it is desirable to use a material having good heat conductivity as well as excellent heat-resistance and shock-resistance. When a color is formed by the surface reflection of the pigment layer as in the latter case, no reflection layer 12 is necessary.

Such reflection layer 12 can be obtained by mirror-polishing a thin metal film.

In the following, explanations will be given in reference to FIG. 10 as to another embodiment of the display element according to the present invention.

In the drawing, a reference numeral 3 designates a transparent protective plate, and a numeral 2 refers to a thin liquid layer, both being the elements having the same functions as those in FIG. 1. A reference numeral 13 denotes an electrically insulating layer having heat-conductivity, on both surfaces of which a plurality of heat-generating resistive wires 14 and 15 are arranged in a manner to intersect mutually with the insulating layer interposed between them. A numeral 16 refers to a supporting body for these heat-generating resistive wires 14, 15 and the electrically insulating layer 13. This display element is so designed that the bubble 4 may be formed in the thin liquid layer 2 at the intersection of these two wires only when predetermined heat-generating resistive wires 14 and 15 are simultaneously selected and generate heat.

In the following, referring to FIG. 11, more detailed explanations will be given as to an embodiment of matrix-driving of such display element.

Figure 10:
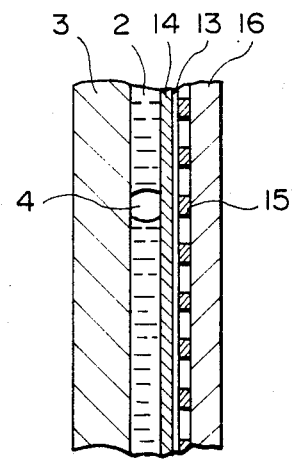

In the drawing, a reference numeral 17 denotes the display element which may have the same specific construction as that in FIG. 10.

Now, when current pulse for heating is applied sequentially to the heat-generating resistive wires $Xl$, $Xm$, $Xn$, $Xo$ and $Xp$ running in the left-right direction in this display element (these resistive wires will hereinafter be called "horizontal lines or rows"), the thin liquid layer (not shown) corresponding to these resistive wires are sequentially heated. At this instant, since the degree of the heating is so set that the temperature of the liquid may not reach the boiling point of the liquid, no bubbles will be generated in this thin liquid layer. On the other hand, a predetermined video-signal is applied to another group of heat generating resistive wires Yc, Yd and Ye arranged in the up-down direction in the display element (these resistive wires will hereinafter be called "vertical lines or rows"), while taking synchronism with application of the heating current pulse.

By this application of the video signal, the thin liquid layer portions corresponding to the respec-vertical rows Yc, Yd and Ye are linearly heated. Also in this case, the degree of heating should be controlled below the boiling point of the liquid, hence no bubbles will be generated in the corresponding thin liquid layer portions by such heating. However, at the intersection of the horizontal and vertical rows where the heating current pulse and the video signal pulse are synchronized, the liquid is heated by the sum of the heat generated from both rows. Therefore, when a condition is so set that the corresponding thin liquid layer may generate bubbles only when it is heated by the sum of the heat generated from both rows, there is formed a bubble 18 at the intersection of the vertical and horizontal rows as selected.

In the above-described embodiment, even when the driving system is changed such that the video signal is applied to the horizontal row and the heating current pulse is applied to the vertical row, the image as desired can be formed in exactly the same manner as described in the foregoing.

The display element as illustrated in FIG. 10 can also be operated by a matrix-driving, as mentioned above.

In the case of the matrix-driving system, the radiation ray absorbing layer naturally becomes unnecessary as the structural element for the display element. In place of this layer, however, it is desirable to provide a separate heat dissipating plate for increasing the heat discharging effect of the resistive wires. For this heat dissipating plate, supporting body 16 (in FIG. 10) may be used as a substitute. The above mentioned horizontal rows and the vertical rows are isolated by the electrically insulating layer 13 having a thickness of a few microns. Therefore, when both signals are simultaneously applied to the horizontal and vertical rows, the heat generated in the horizontal row and that in the vertical row do not reach the thin liquid layer 2 at the same time so that the bubble generation is hindered sometimes. Thus it is preferable in some case that the pulse to a signal line closer to the thin liquid layer 2 is delayed as compared with the signal pulse to a signal line farther from the thin liquid layer 2.

All of both signal lines need not be made of a heat generating resistive body. Rather, from the standpoint of the energy saving purpose, it is preferable that only the intersection of the horizontal row and the vertical row is constructed with a heat generating resistive body, and the other part is constructed with a good electric conductor such as aluminum and the like although the manufacturing process will become disadvantageously complicated.

Figure 11:
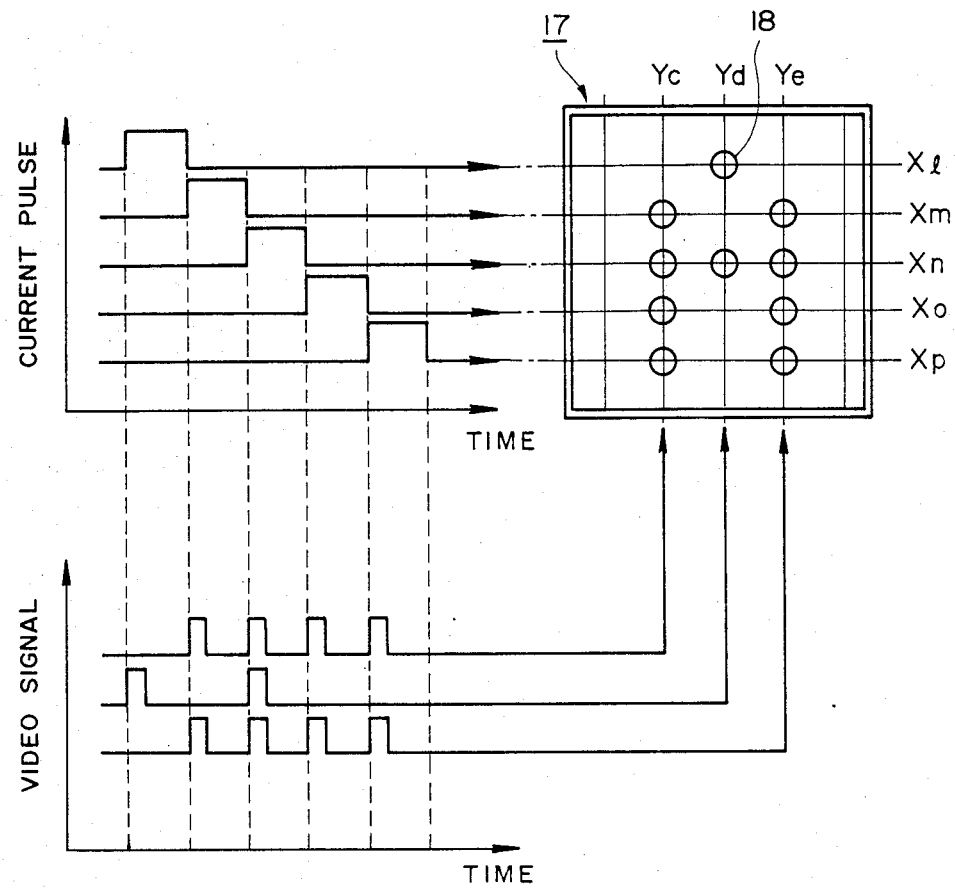
FIG. 11 is a schematic diagram of one embodiment of image forming system according to the present invention.

In the following, explanations will be given in reference to FIG. 12 as to another embodiment of the heat generating element for constructing the display element suitable for the matrix-driving as shown in FIG. 11.

Figure 12:
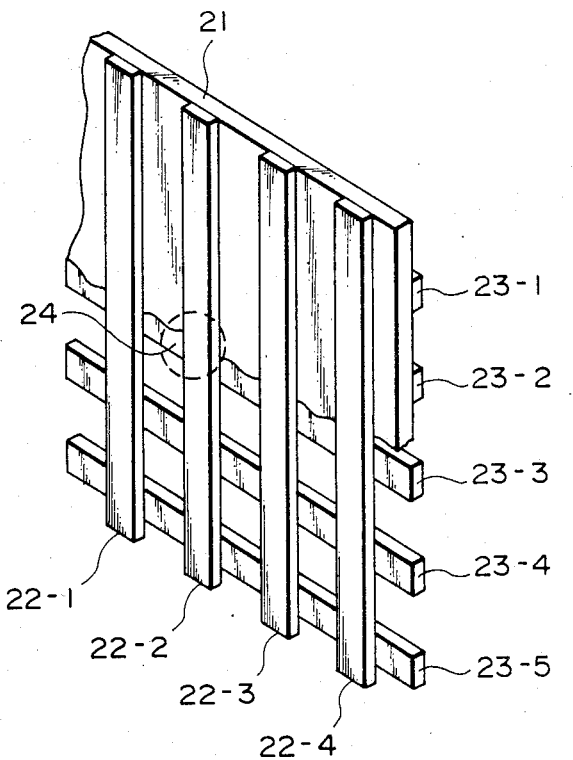
FIG. 12 is a schematic external perspective view for explaining one constructional embodiment of the heat generating element.

FIG. 12 is a perspective view diagrammatically showing a partial region of the heat generating element for use in the display element of the present invention. A reference numeral 21 denotes a heat generating resistive layer which is obtained by forming a well known heat generating resistive body such as nickel-chromium alloy, hafnium boride, tantalum nitride, and the like, into a thin flat film. Though not shown in the drawing, this resistive layer 21 extends, of course, downwards of the illustrated element structure. Numerals 22-1, 22-2, 22-3 and 22-4 all refer to the vertical rows of the resistive wires, and numerals 23-1, 23-2, 23-3, 23-4 and 23-5 refer to the horizontal rows of the resistive wires. These conductor wires are all made of good electric conductive materials such as gold, copper, aluminum, and the like. In the heat generating element as illustrated, when the vertical row 22-2 and the horizontal row 23-3 are selected, for example, and a voltage is applied to these rows of the conductor wires, electric power is supplied to a part of the resistive layer 21 corresponding to the intersection 24 of both these vertical and horizontal rows, and heat is generated at this position. In this manner, an arbitrary intersection (of the vertical and horizontal rows) can be heated by appropriate selection of the vertical and horizontal rows of the conductor wires and then passing electric current through them.

Accordingly, in the display element as shown in FIG. 10 wherein the heat generating element is incorporated, the dot-matrix image can be displayed by the matrix-driving system same as that illustrated in FIG. 11.

In the heat generating element shown in FIG. 12, it is also possible to provide the heat generating resistive layer 21 at only the intersections of the horizontal rows and the vertical rows of the conductor wires by dividing the resistive layer 21 piecemeal in correspondence to the intersections (in other regions, the conductor wires per se are insulated from each other). In such construction (not shown), it is possible to present substantially generation of the cross-talks which are not desirable for the image formation faithful to the signals. Moreover, when a heat generating resistive body having the diode characteristics is provided at each intersection of the horizontal row and the vertical row of the conductor wire, the cross-talks can be perfectly prevented.

In the case of the display system operated by the matrix-driving using the heat generating element as explained in the foregoing, the color display can be also effected by adoption of the same construction as illustrated in FIG. 9. Although not shown in the drawing, when such display element is rendered light-transmitting, there can be obtained the so-called transmitting type display element. Whether the type of the display element is the transmitting type or the reflecting type, is only due to a difference in the observing direction of the display element, but not due to a difference in the image forming principle of the present invention.

Figure 13:
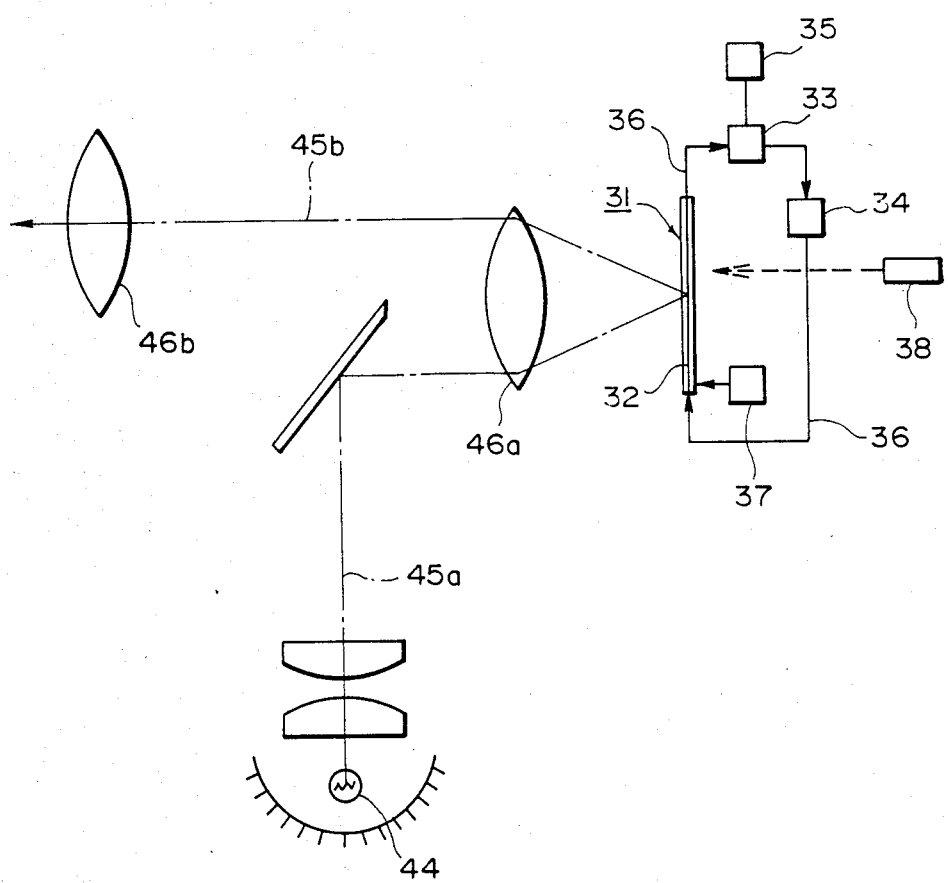
FIG. 13 is a general structural diagram of the display device as one application of the present invention.
Figure 14:
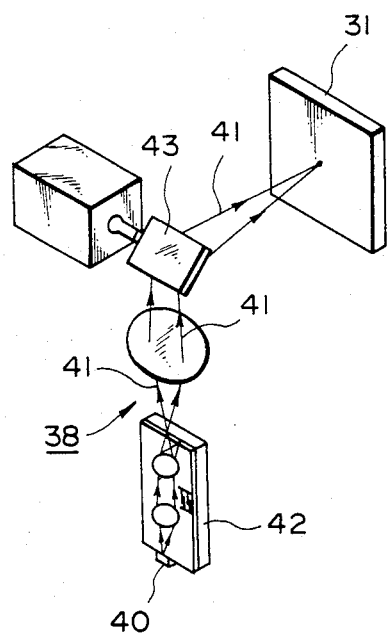
FIG. 14 shows a schematic external perspective view for explaining the optical system in FIG. 13.

In the following, another embodiment of application of the present invention will be explained in reference to FIGS. 13 and 14. FIG. 13 is a schematic structural diagram of the display device and FIG. 14 is a schematic perspective view for explaining the optical system for this display device.

In FIG. 13, when the display element 31 is continuously operated for a long period of time, the temperature of the thin liquid layer 32 in the element 31 is gradually raised by heat accumulation (because the liquid is in a thin layer form) and sometimes bubbles happen to be generated in the thin liquid layer 31. Thus, such increase in the quantity of heat accumulation causes undesirable noises. In the illustrated embodiment, therefore, the liquid in the thin layer 32 is made to circulate in the display element 31, an evaporating chamber 33, and a liquefying chamber 34 so as to prevent the heat accumulation in the thin liquid layer 32.

The evaporating chamber 33 functions to deprive the liquid of excessive heat in the form of the evaporative heat, and to absorb or relax pressure generated by the bubble formation due to signals. A pressure reducing means 35 is attached to the evaporating chamber 33 for maintaining the chamber at a predetermined reduced pressure. When the interior of the thin liquid layer 32 is kept at a low pressure level by this pressure reducing means 35, the bubble can be formed at a lower temperature, hence driving energy can be reduced. Furthermore, since the evaporating speed of the liquid increases, heat dissipation speed also increases. This is another advantage of the pressure reducing means. The evaporated liquid is subsequently liquefied in the liquefying chamber 34 where heat is discharged outside the system, and the liquid is again fed to the thin liquid layer 32 in the display element 31 by way of a circulation conduit 36. Therefore, the above mentioned liquid circulating system wherein the liquid is circulated from the thin liquid layer 32 to the evaporating chamber 33 through the circulation conduit 36, further from this evaporating chamber 33 to the liquefying chamber 34, and subsequently from the liquefying chamber 34 back to the thin liquid layer 32, while maintaining a reduced pressure level by the pressure reducing means 35, exhibits the effects of (1) eliminating the thermal noises which are liable to cause defects in the resulting image and (2) eliminating noises due to pressure applied in the thin liquid layer.

Further, by additional provision of cooling means 37 comprising a heat dissipating means, a Peltier effect element or the like in the display element 31, the above mentioned effects can further be promoted.

In order to apply the heat signal to such display element 31, an optical system 38 as shown in FIG. 14 may be utilized. In FIG. 14, a laser beam 41 output from a laser 40 passes through a thin film wave-guide type deflector 42, and then it scans the surface of the display element 31 at a high speed while it is being reflected by a galvano-mirror 43. By connecting an image signal circuit (not shown) with the above mentioned laser 40, an actual image formation becomes possible. In practice, the laser beam having a spot diameter of approximately several tens microns irradiates intermittently the display element 31. Since the practical image forming mechanism in the display element 31 has already been detailed in the foregoing, any further explanations will be omitted here.

In this manner, during formation of an image on the display element 31, or upon completion of the image formation thereon, when an observing light 45a is projected from an illuminating light source 44 to the display element 31, a reflected light 45b of the observing light 45a passes through a magnifying and projecting lens system 46a, 46b, and a magnified image is projected on a screen (not shown) thereby (vide FIG. 13).

It is not always that the liquid circulating system explained in reference to FIG. 13 is provided with any forced liquid circulating device such as pump and the like. In other words, the liquid circulating system may be constructed by utilizing the natural convection of the liquid.

Even when the liquid circulating system as mentioned above is adopted, the formation of the bubbles (display picture element) in the thin liquid layer causes disturbance of the image, hence flow of the liquid during this bubble formation period should be avoided. That is to say, the timing and speed for the liquid circulation should desirably be synchronized with the displaying period for one frame.

The pressure reducing means 35 can be constructed by use of a vacuum pump or an electromagnetic valve. It is also desirable that fins are provided on the outer wall of the liquefying chamber 34 for the purpose of accelerating the heat dissipation.

The size of the bubbles contemplated in the present invention usually ranges from 10 $\mu$m to 100 $\mu$m or so in diameter when the image resolving power is taken into consideration. However, when the resolution is not significant, the bubble size may be practically outside the above mentioned range.

A time period from application of the heat pulse to the liquid to the formation of the bubbles, which is called "rising time", is 10 $\mu$sec. or so. On the other hand, a time period for the bubbles to disappear after stopping the application of the heat pulse, which is called "trailing time", is 30 $\mu$sec. at its fastest. These rising time and trailing time vary depending upon various conditions such as liquid temperature, liquid pressure, pulse applying time, heat dissipation, and the like in the thin liquid layer. Moreover, they are apt to be influenced by viscosity and surface tension of the liquid, hence these time periods cannot be defined in general terms. However, from the standpoint of the after-image effect and the like, the trailing time is not required to be so quick. A desired trailing time can be readily established by adjusting the composition of the liquid in the layer. In general, the liquid for use in the present invention may be prepared from various types of solvent, dye, pigment and the like. As the dye, there are direct dye, acid dye, organic solvent dye, and so forth. As the solvent, there are water, alcohol type solvent, glycol type solvent, ketone type solvent, ester type solvent, hydrocarbon type solvent, and so on. In particular, ethyl alcohol, methyl alcohol, isopropyl alcohol, ethylene glycol, ethylcellosolve, diethyl glycol, freon, and a mixture of these liquids are suitable for the purpose. The low boiling point solvent is advantageous in point of saving the electric power since it forms bubbles at a low temperature. When it is desired to retain the bubbles as long as possible, i.e., when the display picture elements are to be retained, a liquid which is not easily cooled and has an appropriately high viscosity is preferred. In addition, when it is desired to variably control the bubble retaining time, the above mentioned pressure reducing means is effective. That is, the lower the liquid pressure, the lower the temperature for the bubble formation. Accordingly, as the pressure within the thin liquid layer is made lower, the retaining time for the image display becomes longer. Particularly, when a still picture or a motion picture in slow motion is to be displayed, the pressure reduction in the liquid is effective.

As has been explained in detail so far, the principal effects of the present invention can be summarized as follows.

(1) A single very fine bubble can be made a unit of the picture element for display, and a multitude of such bubbles can be arranged at a high density. Hence, there can be effected the image display with high resolution.

(2) By controlling the retention time in the liquid layer of the bubbles as the display picture elements, display of a still picture or a motion picture including a slow motion picture can be effected easily.

(3) By adopting the liquid circulation system in the display element, a good image display free from noise can be presented.

(4) Multi-color display and full color display can be done easily.

(5) Due to a relatively simple construction of the display element, its productivity is high and its durability is high, hence high operational reliability.

(6) The display element can be adapted to various driving systems.

What I claim is:

1. A display element for display of a visible image, said element comprising a non-light-transmittive liquid layer and a heat generating element disposed behind said liquid layer to produce bubbles in said liquid layer in accordance with selective heating of different portions of said heat generating element;

wherein the contrast between the image and non-image sections of the display element is based on the difference between the light reflected from behind said liquid layer and the light reflected from said liquid layer.

2. A display element for display of a visible image, said element comprising a light-transmissive liquid layer and a heat generating element disposed behind said liquid layer to produce bubbles in said liquid layer in accordance with selective heating of different portions of said heat generating element;

wherein the contrast between the image and non-image sections of the display element is based on the difference between light reflected from points behind each bubble and from points behind light-transmissive liquid.

3. The display element according to claim 1 or claim 2, wherein said heat generating element is disposed in contiguity to, or in contact with, said liquid layer.

4. The display element according to claim 1 or claim 2, wherein said heat generating element is a radiation ray absorbing layer.

5. The display element according to claim 1 or claim 2, wherein said heat generating element is a heat generating resistive member.

6. The display element according to claim 1, wherein said liquid layer consists of a colored liquid.

7. The display element according to claim 1, wherein said liquid layer consists of a light dispersing liquid.

8. The display element according to claim 2, wherein the liquid layer and the heat generating element are light-transmissive.

9. The display element according to claim 1 or claim 2, wherein a reflecting layer or a light diffusion layer is interposed between said heat generating element and said liquid layer.

10. The display element according to claim 1 or claim 2, wherein the interface of contact between said heat generating element and said liquid layer is light-diffusive.

11. The display element according to claim 1 or claim 2, further comprising a colored filter layer or a non-light-transmitting color forming layer to form color in the bubble portion.

12. The display element according to claim 11, wherein said colored filter layer or said non-light-transmitting color forming layer is constituted of an assembly of a plurality of divided different color portions.

13. The display element according to claim 1 or claim 2, wherein said heat generating element is constituted of a plurality of heat generating portions arranged in a dot-matrix form.

14. The display element according to claim 1 or claim 2, further comprising a heating element to heat said liquid layer to an extent such that no bubble is produced.

15. The display element according to claim 1 or claim 2, further comprising a pressure absorbing member.

16. The display element according to claim 1 or claim 2, further comprising cooling means.

17. The display element according to claim 1 or claim 2, further comprising a corrosion-resistant layer.

18. A display device for display of a visible image, said device comprising a display element consisting essentially of a non-light-transmissive liquid layer and a heat generating element disposed behind said liquid layer to produce bubbles in said liquid layer in accordance with selective heating of different portions of said heat generating element and a liquid circulation conduit communicatively connected with said liquid;

wherein the contrast between the image and non-image sections of the display element is based on the difference between the light reflected from behind said liquid layer and the light reflected from said liquid layer.

19. A display device for display of a visible image, said device comprising a display element consisting essentially of a light-transmissive liquid layer and a heat generating element disposed behind said liquid layer to produce bubbles in said liquid layer in accordance with selective heating of different portions of said heat generating element and a liquid circulation conduit communicatively connected with said liquid layer;

wherein the contrast between the image and non-image sections of the display element is based on the difference between light reflected from points behind each bubble and from points behind light-transmissive liquid.

20. The display device according to claim 18 or claim 19, wherein the liquid in said liquid layer is subjected to evaporation and liquefaction on the way of said liquid circulation conduit.

21. The display device according to claim 18 or claim 19, further comprising pressure reducing means provided on the way of said liquid circulation conduit.

22. The display device according to claim 18 or claim 19, wherein said liquid layer and said heat generating element are disposed is contiguity to, or in contact with, each other.

23. The display device according to claim 18 or claim 19, wherein said heat generating element is a radiation ray absorbing layer.

24. The display device according to claim 22, wherein said heat generating element is a radiation ray absorbing layer.

25. The display device according to claim 18 or claim 19, further comprising signal input means to introduce into said display element a signal due to radiation ray in accordance with image information.

26. An image display method which comprises producing bubbles in a non-light transmissive liquid layer with a heating element disposed behind said liquid layer and forming a visible image utilizing said bubbles as picture elements such that the image contrast is based on the difference between the light reflected from behind said liquid layer and the light reflected from said liquid layer.

27. An image display method which comprises producing bubbles in a light-transmissive liquid layer with a heating element disposed behind said liquid layer and forming a visible image utilizing said bubbles as picture elements such that the image contrast is based on the difference between light reflected from points behind each bubble and from points behind light-transmissive liquid.

28. The display method according to claim 26 or claim 27, wherein a plurality of picture elements are formed by heating a plurality of points in said liquid layer to produce bubbles therein, and said picture elements are assembled to form visual image.

29. The image display method according to claim 26 or claim 27, further comprising projecting an image derived from said bubbles as the picture elements.

* * * * *

UNITED STATES PATENT AND TRADEMARK OFFICE
CERTIFICATE OF CORRECTION

PATENT NO. : 4,536,061

DATED : August 20, 1985

INVENTOR(S) : YUKUO NISHIMURA

It is certified that error appears in the above-identified patent and that said Letters Patent is hereby corrected as shown below:

Column 2, line 8, change "followings" to --following--.

Column 3, line 13, change "tranmitting" to --transmitting--.

Column 4, line 24, change "practised" to --practiced--.

Column 5, line 63, change "case" to --cases--.

Column 12, line 57, change "is" to --in--.

Signed and Sealed this

Twelfth Day of August 1986

[SEAL]

Attest:

DONALD J. QUIGG

Attesting Officer

Commissioner of Patents and Trademarks